(12) United States Patent　　(10) Patent No.:　　US 6,250,349 B1
Crofutt　　(45) Date of Patent:　　Jun. 26, 2001

(54) JOINTER FENCE SYSTEMS AND METHODS

(75) Inventor: William E. Crofutt, Sedro Woolley, WA (US)

(73) Assignee: Grizzly Industrial, Inc., Bellingham, WA (US)

( * ) Notice: Subject to any disclaimer, the term of this patent is extended or adjusted under 35 U.S.C. 154(b) by 0 days.

(21) Appl. No.: 09/532,410

(22) Filed: Mar. 22, 2000

(51) Int. Cl.$^7$ ................................................. B27B 31/00
(52) U.S. Cl. ................................. 144/253.5; 144/253.8
(58) Field of Search ........................... 144/253.1, 253.5, 144/253.8, 129, 130

(56) References Cited

U.S. PATENT DOCUMENTS

| 381,752 | * | 4/1888 | Beach | 144/253.82 |
|---|---|---|---|---|
| 2,619,998 | * | 12/1952 | Okamuro | 144/253.82 |
| 2,804,107 | * | 8/1957 | Taylor | 144/253.82 |
| 2,872,957 | * | 2/1959 | Eschenburg | 144/253.82 |
| 3,035,619 | | 5/1962 | Gaskell . | |
| 5,022,447 | | 6/1991 | Monobe . | |
| 5,533,557 | | 7/1996 | Jedlicka et al. . | |
| 6,026,870 | * | 2/2000 | Liu | 144/253.52 |

FOREIGN PATENT DOCUMENTS 644675　　7/1962　(CA) .

OTHER PUBLICATIONS

Grizzly Model G1018 8" Heavy Duty Jointer, Instruction Manual, revised Mar. 1994.
Grizzly Model G1182 Heavy Duty Jointer, Instruction Manual, revised Feb. 1999.
King Wooma Model No. CC–A516 Hand Jointer, Product Specification, Description, Instructions, and Parts List.

* cited by examiner

*Primary Examiner*—W Donald Bray
(74) *Attorney, Agent, or Firm*—Michael R. Schacht; Hughes & Schacht, PLLC (57) ABSTRACT

A jointer fence assembly and method for a jointer system comprising a table assembly defining a table surface and a cutter gap and a cutter assembly arranged within the cutter gap. The jointer fence assembly comprises a fence member assembly defining a fence surface, a fence extension assembly, a fence tilt assembly, and a fence lock assembly. The fence extension assembly comprising a fence support that may be moved across the cutter gap. The fence tilt assembly is connected between the fence support and the fence member assembly such that the fence member assembly rotates about a fence pivot axis spaced above the table surface. The fence lock assembly is connected between the fence support and the fence member to allow a fence angle between the fence surface and the table surface to be locked into a desired angle. During operation of the fence assembly, a portion of the fence member assembly extends below the fence axis such that the fence member assembly is closely adjacent to the table surface as the fence member assembly rotates about the fence pivot axis.

24 Claims, 9 Drawing Sheets

JOINTER FENCE SYSTEMS AND METHODS

FIELD OF THE INVENTION

The present invention relates to jointer fence systems and methods and, more specifically, to adjustable fences for supporting a work piece at a desired angle and location relative to a jointer table.

BACKGROUND OF THE INVENTION

A jointer is designed to allow an operator to form a precise angle between two surfaces on a work piece, usually a wood board to be used in a final product such as furniture, cabinetry, interior trim, and the like. Often, the angle between the two surfaces must be exact to obtain a final product of high quality.

The jointer comprises a table assembly having first and second table sections. A gap is formed between the two table sections. A cutter assembly defining a cylindrical cutting path is mounted to the table assembly between the first and second table sections such that the cutting path extends into and along the length of the gap. A jointer fence assembly is mounted to the table assembly such that a jointer fence surface is supported above the first and second table sections and extends across the gap; the jointer fence defines, and thus will be parallel to, the direction of travel of the work piece during cutting. In particular, the operator places the work piece on the first table section and, while firmly holding the work piece against the jointer fence surface, slides the work piece over the gap. The cutter assembly removes a small amount of the work piece as the work piece slides over the gap.

The gap defines a gap width, a gap length, and a gap offset. The gap width is the distance between the first and second table sections in the direction of travel of work piece. The gap length is the dimension of the gap in a direction transverse to the direction of travel of the work piece. The first and second table sections define first and second planar table surfaces, respecively. Normally, the second table surface will be approximately the same height as the cutting plane and slightly higher than the first table surface so that the work piece is stably supported after it has been cut. The gap offset is the difference in vertical height between the first and second table surfaces.

Often, the jointer fence assembly is adjustable such that a location of the jointer fence assembly along the gap length can be adjusted. This allows the amount of exposed gap (and thus rotating cutter assembly) to be controlled to just the amount necessary for the dimensions of the work piece being cut.

The surface of the work piece that is held against the jointer fence surface will be referred to herein as the reference surface. The surface that is cut by the jointer cutter assembly will be referred to as the cut surface. The angle between the jointer fence surface and the longitudinal axis of the cylindrical cutting path will be referred to herein as the jointer fence angle. The angle between the reference and cut surfaces after the cut has been made will be referred to as the cut angle. The jointer fence angle will define the cut angle.

Normally, while designing the final product, the operator determines a desired angle between the reference surface and the cut surface. To ensure that the actual cut angle formed equals the desired angle, the jointer fence angle must be set precisely and the fence assembly locked in place such that this angle does not change during a given cut or even during subsequent cuts.

A number of factors complicate the design and fabrication of a jointer fence assembly that allows a jointer fence angle to be set accurately and consistently to match the desired angle. For example, the desired angle may be different for different cuts; the operator therefore must be able to adjust the jointer fence angle. To be adjustable, the fence assembly must use pivots or hinges that allow do not the fence assembly to move slightly when the work piece is securely held against the fence surface. Any such movement of the fence assembly may allow the jointer fence angle to deviate from the desired angle.

In addition, a design that allows the jointer fence surface to be moved across the length of the gap also creates the possibility of movement that allows the jointer fence angle to deviate from the desired angle.

The need thus exists for jointer fence systems and methods that may be manufactured at reasonable cost but which allow the formation of a cut angle that matches a desired angle with a high degree of accuracy.

PRIOR ART

The Applicant is aware of a number of jointer fences that are currently on the market.

Grizzly Industrial, Inc., the assignee of the present invention, currently sells a line of jointers adapted to use a jointer fence. The Grizzly Model G1018 8" Heavy Duty Jointer and Model G1182 6" Heavy Duty Jointer (G1182 HW; G1182 Z; G1182 ZX) incorporate a hinge member that is connected between a fence base and a fence member by parallel hinge connections. The fence bases of these machines are slideably mounted on the table assembly such that the entire fence assembly can be moved across the cutter gap. Each of the hinge connections of the Grizzly Heavy Duty Jointers creates the opportunity for movement that can cause the cut angle to be inaccurate.

The Applicant is also aware of the King Wooma Model No. CC-1516 Hand Jointer. This jointer employs a jointer fence comprising a base member that is pivotably connected to a fence member by a hinge connection and rigidly bolted to a cylindrical bar. The hinge connection is formed by a hinge member and a hinge bracket. The hinge bracket is rigidly bolted to the fence member. The hinge member extends through a slot in the base member and is pivotably connected at its ends to the hinge bracket. The hinge member can move up and down within the slot to allow the angle of the fence member to be changed. The cylindrical bar extends through a cylindrical opening in a bar mount and allows movement of a base member, and thus the fence member, along the length of the cutter opening. The hinge connection used by this device creates numerous points where movement may occur between the base member and the fence member.

The following references were uncovered as part of a professional patentability search conducted on behalf of the Applicant:

U.S. Pat. Nos. 5,533,557 to Jedlicka et al. and 3,035,619 to Gaskell disclose jointer fences in which the fence is pivotably connected at its lower end to a fence base.

U.S. Pat. No. 5,022,447 to Monobe discloses a jointer fence that pivotally connected to a support plate at a location spaced behind the fence member. This patent discloses a fence guard that is drawn over the cutter behind the fence as the fence moves across the table.

Canadian Patent No. 644,675 discloses a jointer fence having a rounded bottom edge.

From the foregoing, it should be clear that a primary object of the present invention is to provide improved fence systems for jointers.

SUMMARY OF THE INVENTION

These and other objects are obtained by a jointer fence assembly and method for a jointer system as described herein. The jointer system comprises a table assembly defining a table surface and a cutter gap and a cutter assembly arranged within the cutter gap. The jointer fence assembly comprises a fence member assembly defining a fence surface, a fence extension assembly, a fence tilt assembly, and a fence lock assembly. The fence extension assembly comprising a fence support that may be moved across the cutter gap. The fence tilt assembly is connected between the fence support and the fence member assembly such that the fence member assembly rotates about a fence pivot axis spaced above the table surface. The fence lock assembly is connected between the fence support and the fence member that allows a fence angle between the fence surface and the table surface to be locked into a desired angle. During operation of the fence assembly, a portion of the fence member assembly extends below the fence axis such that the fence member assembly is closely adjacent to the table surface as the fence member assembly rotates about the fence pivot axis.

The present invention may be embodied as a method of supporting a work piece during cutting with a jointer system. In particular, the present invention may be defined as a method of supporting a workpiece on a jointer system defining a table surface and a cutter gap. This method comprises the steps of providing a fence member assembly defining a fence surface and a fence extension assembly comprising a fence support. The fence member assembly is connected to the fence support such that the fence member assembly rotates about a fence pivot axis spaced above the table surface and the fence member assembly is closely adjacent to the table surface as the fence member assembly rotates about the fence pivot axis. The fence member is locked relative to the support member to fix a fence angle between the fence surface and the table surface at a desired angle. The workpiece is arranged against the table surface and the fence surface during operation of the jointer system.

DETAILED DESCRIPTION

Figure 1:
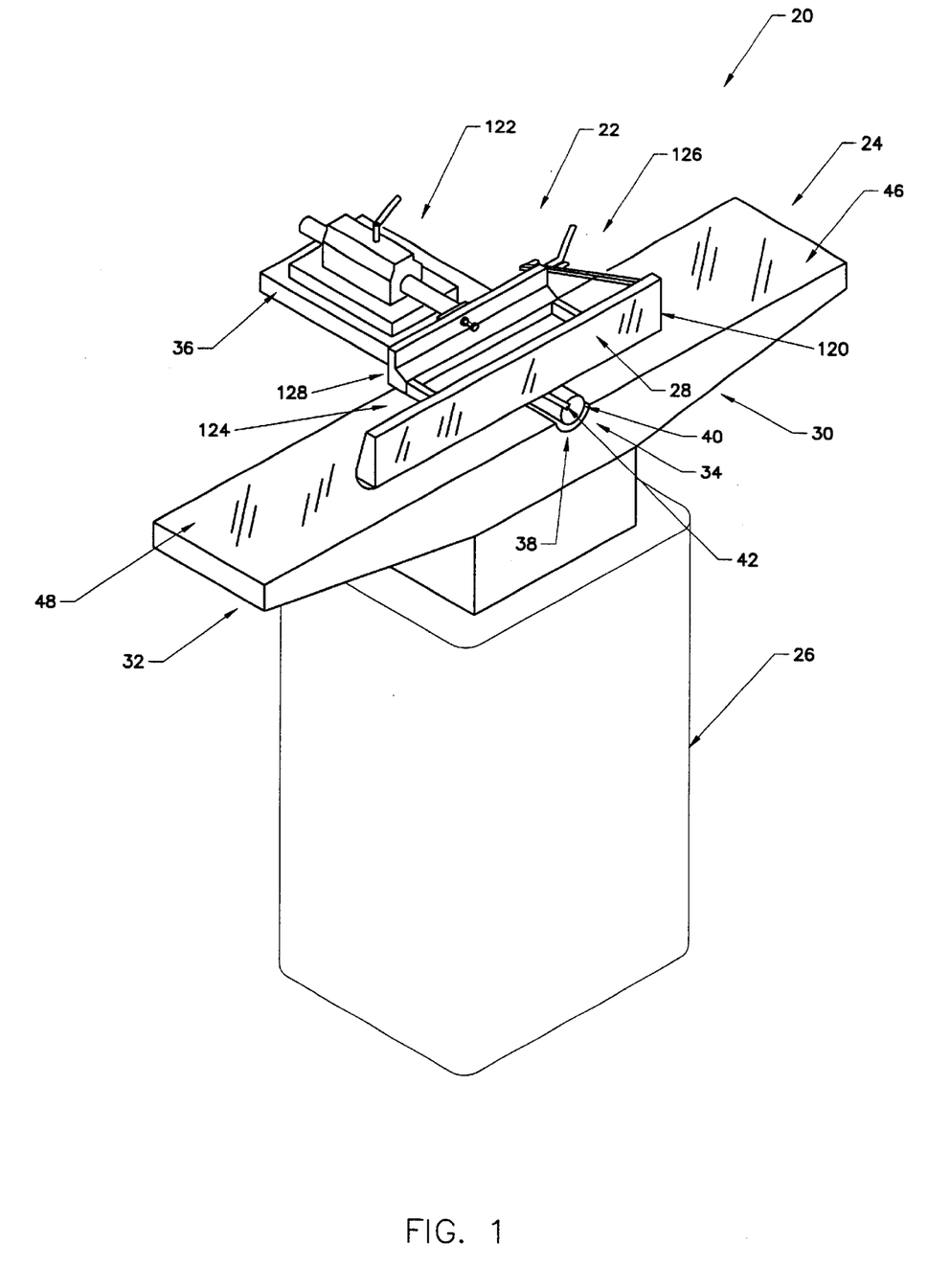
FIG. 1 is a perspective view of a jointer system incorporating a jointer fence constructed in accordance with, and embodying, the principles of the present invention.

Referring now to the drawing, depicted in FIG. 1 of the drawing is a jointer system 20 incorporating a jointer fence assembly 22 constructed in accordance to, and incorporating, the principles of the present invention. The jointer system comprises, in addition to the jointer fence assembly 22, a jointer table assembly 24 and a base assembly 26.

The jointer table assembly 24 and base assembly 26 are, or may be, conventional and will be described herein only to the extent necessary for a complete understanding of the present invention.

The jointer table assembly 24 comprises an infeed table 30, an outfeed table 32, a cutter assembly 34, and a fence platform 36. A gap 38 is formed between the infeed and outfeed tables 30 and 32. The cutter assembly 34 is arranged within the gap 38. The jointer fence assembly 22 is mounted to the table assembly 24 such that a jointer fence surface 28 is supported above the infeed and outfeed tables and extends across the gap 38; the jointer fence surface thus defines, and is parallel to, the direction of travel of a work piece being cut.

In particular, during operation of the jointer system 20, the workpiece is drawn across the gap 38 while being supported by the infeed and outfeed tables 30 and 32 and held against the fence assembly 22. The cutter assembly 34 removes a small amount of material from a side, usually an edge, of the workpiece such that the edge is at a predetermined angle to the side of the workpiece that is held against the fence assembly 22. The side of the workpiece cut by the jointer system 20 will be referred to herein as the cut surface; the side of the workpiece held against the fence assembly 22 will be referred to herein as the reference surface.

The angle between the cut surface and the reference surface will be referred to as the cut angle. The angle formed by the fence surface 28 and the table assembly 24 will be referred to as the jointer fence angle.

Before operating the jointer system 20, the operator will determine a desired angle between the reference surface and the cut surface. The jointer fence angle should equal the desired angle.

Figure 2:
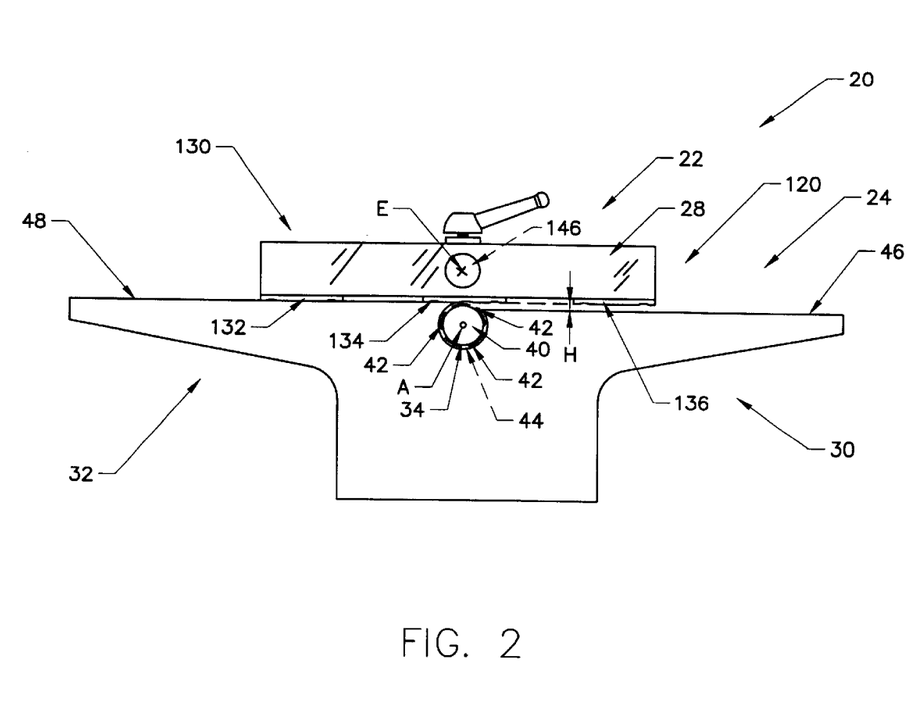
FIG. 2 is a front elevation view of a jointer fence assembly and jointer table assembly of the jointer system of FIG. 1.

As shown in FIG. 2, the cutter assembly 34 comprises a cutter drum 40 and a plurality of cutting blades 42 secured to the cutting drum 40. The cutter drum 40 rotates about a cutter axis A such that the cutter blades 42 define a cutting path 44. The cutter drum 40 and cutting path 44 are cylindrical in shape, and the longitudinal axes thereof are aligned with the cutter axis A.

Figure 3:
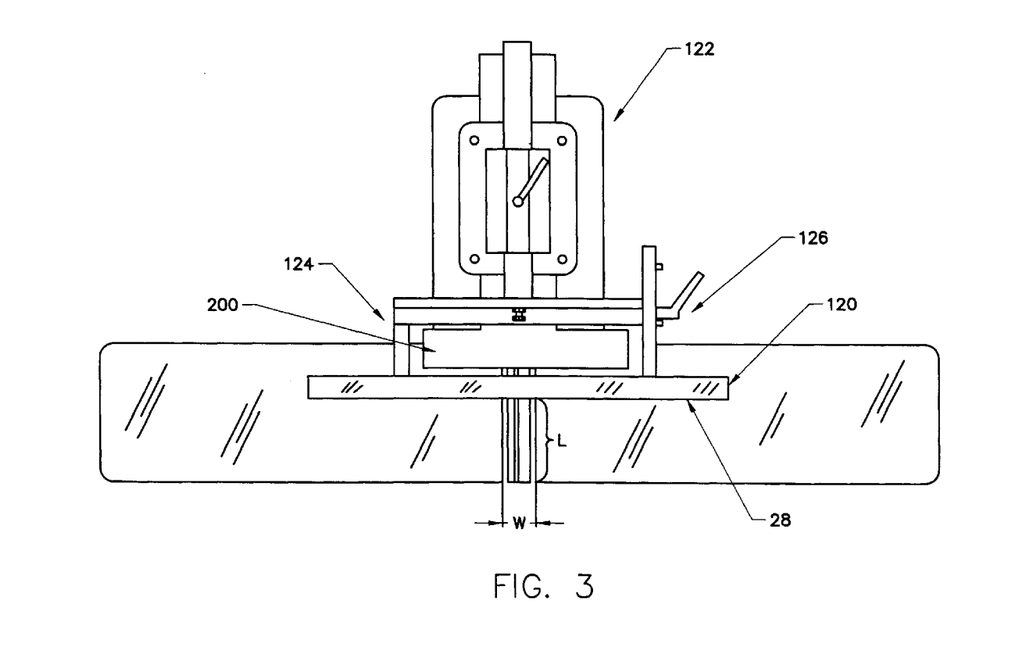
FIG. 3 is a top plan view of the jointer fence assembly and jointer table assembly of the jointer system of FIG. 1.

As perhaps best shown in FIGS. 2 and 3, the gap 38 defines a gap width W, a gap length L, and a gap height H. The gap width W is the distance between the infeed and outfeed tables 30 and 32 in the direction of travel of the work piece. The gap length L is the effective dimension of the gap 38 in a direction transverse to the direction of travel of the work piece. The gap height H is the difference in vertical height between infeed and outfeed table surfaces 46 and 48 of the infeed and outfeed tables 30 and 32, respectively.

Normally, the infeed surface 46 is slightly lower than the uppermost point of the cutting path 44 and the outfeed table surface 48 is approximately the same height as the uppermost point of the cutting path 44. The gap height H thus defines the depth of cut made by the system and may be varied to change the depth of cut. The relative vertical positions of the infeed and outfeed surfaces 46 and 48 are set to support of the work piece as it is cut.

The jointer fence assembly 22 is normally adjustable such that a location of the jointer fence assembly 22 relative to the jointer table assembly 24 can be changed to changed the effective gap length L. This allows the amount of exposed gap 38 (and thus rotating blade assembly) to be adjusted as necessary for the dimensions of the work piece being cut.

With the basic operation of the jointer system 20 in mind, the details of construction and operation of the jointer fence assembly 22 will now be discussed.

The jointer system 22 comprises a fence member assembly 120, a fence extension assembly 122, a fence tilt assembly 124, a fence lock assembly 126, and a fence guard assembly 128.

The fence member assembly 120 defines the fence surface 28 described above. The fence extension assembly 122 supports the fence member assembly 122, fence tilt assembly 124, fence lock assembly 126, and fence guard assembly 128 such that these assemblies 122 and 124–128 can move across the cutter gap 38 to vary the gap length L thereof.

The fence tilt assembly 124 allows the fence member assembly 120 to tilt to adjust the jointer fence angle between the fence surface 28 and the table surfaces 46 and 48. The fence lock assembly 126 allows the fence member assembly 120 to be fixed in a desired jointer fence angle relative to the table surfaces 46 and 48. The fence guard assembly 128 extends behind, and moves with, the fence member assembly 120 to cover the cutter gap 38 behind the fence member assembly 120.

As perhaps best shown in FIG. 2, the fence member assembly 120 comprises a fence member 130 and a plurality of fence protector members 132, 134, and 136. The fence member 130 is a metal member preferably formed of cast steel and defines the fence surface 28 described above. The fence surface 28 is desirably a planar surface, and the fence member 130 is manufactured to minimize weight yet still be sufficiently rigid to keep the fence surface 28 planar during normal use of the jointer system 20. The fence member 130 is thus generally conventional in that it comprises relatively thin walls to reduce weight and a network of bracing flanges to increase rigidity. The exact dimensions of the fence member 130 are not critical to the implementation of the present invention except as will be discussed below.

The fence protector members 132–136 are made of a resilient, flexible material such as rubber, synthetic rubber, or the like. These members 132–136 are bolted to the underside of the fence member 130 using bolts 138. The end-most protector members 132 and 136 prevent contact between the fence member 130 and the infeed and outfeed tables 30 and 32 that would damage any of these members 130, 30, or 32. The middle protector member 134 is arranged between the fence member 130 and the cutter assembly 34 to prevent contact therebetween. A single protector member that extends substantially along the length of the fence member may be used in place of the three discrete protector members 132–136 described herein.

Figure 5:
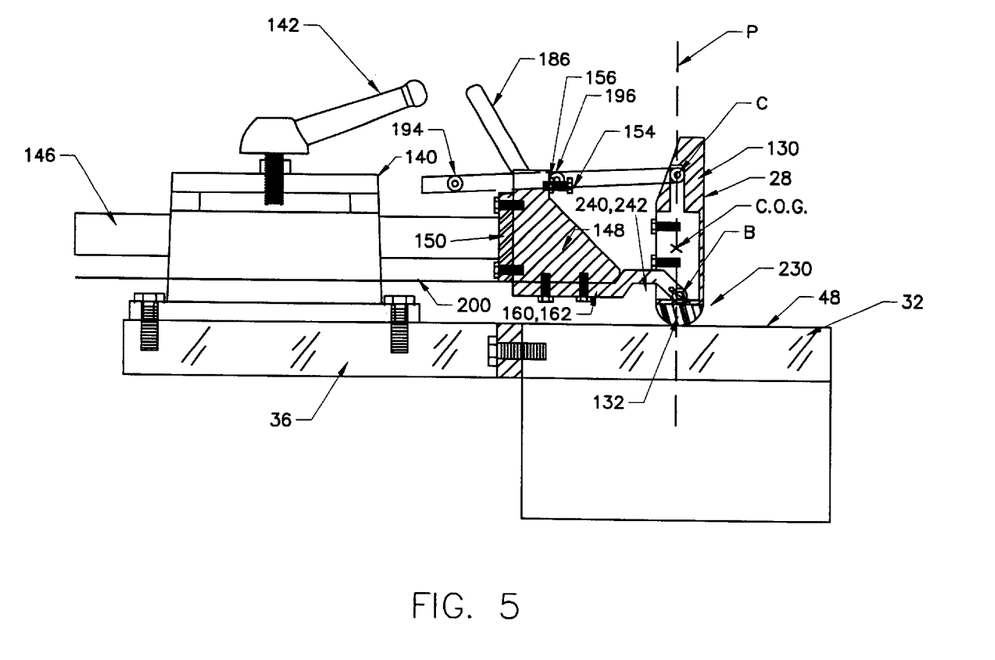
FIG. 5 is a side elevation view of the jointer table assembly and partial section view of the jointer fence assembly of the jointer system of FIG. 1.

As shown in FIG. 5, the protector members 132–136 are substantially semi-circular in cross-sectional area. The protector members 134 can take any cross-sectional shape, but a curved cross-sectional shape is preferred as will be described below.

Referring again to FIGS. 3 and 4, the fence extension assembly 122 will now be described in further detail. The fence extension assembly 122 comprises a clamp member 140 into which a clamp handle 142 is threaded. A clamp block 144 is arranged within the clamp member 140. A fence tube 146 is extends partly through the clamp member 140 below the clamp block 144. Rotation of the clamp handle 142 causes the clamp handle 142 to move towards and away from the clamp block 144 to clamp or release the fence tube 146 between the clamp member and the clamp block 144. When clamped, the fence tube 146 is prevented from moving relative to the clamp member 140. When released, the fence tube 146 can be slid towards and away from the clamp member 140 along the longitudinal axis of the tube 146.

Figure 4:
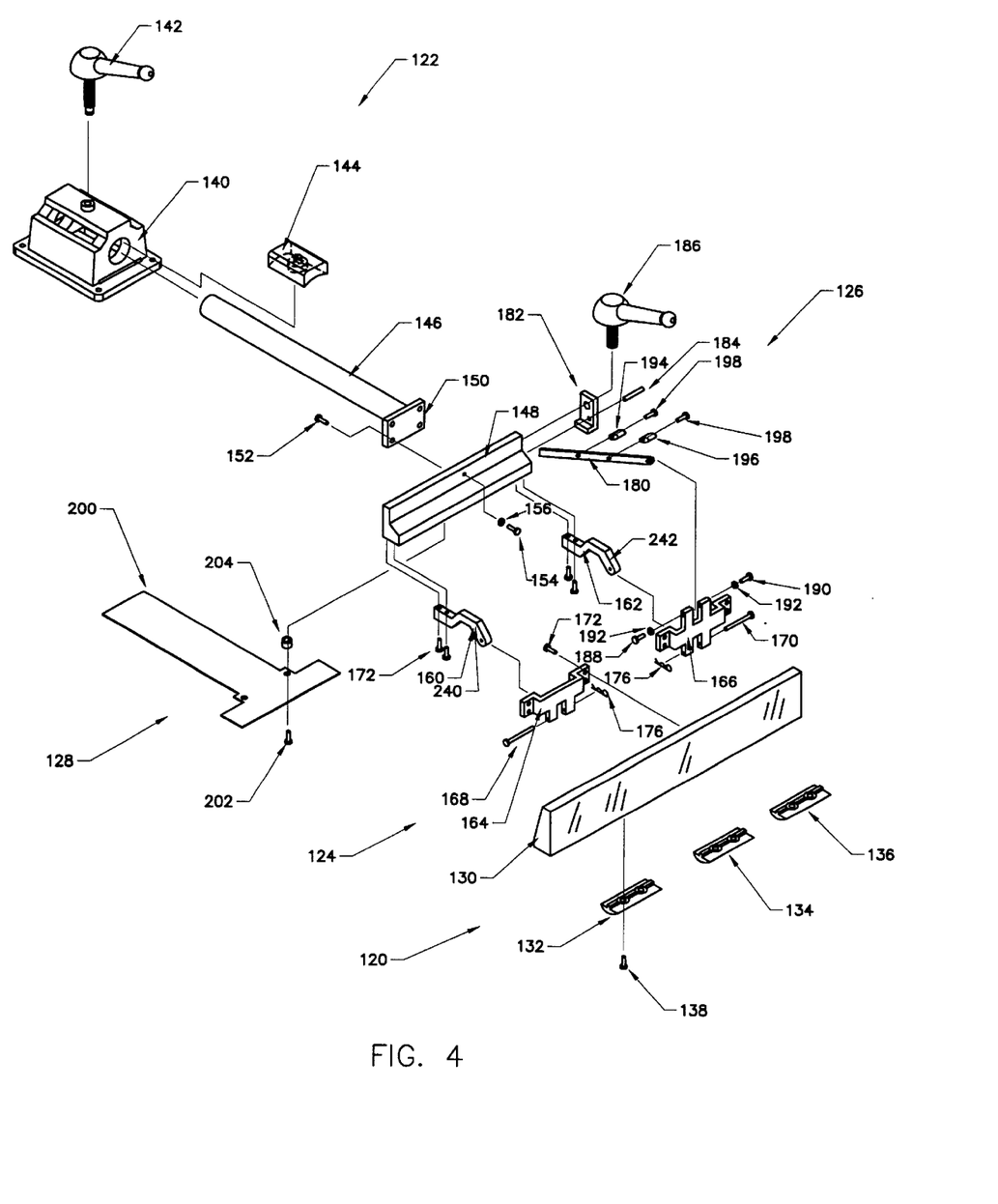
FIG. 4 is an exploded view of the jointer fence assembly of the jointer system of FIG. 1.

A fence support 148 is rigidly attached to an end of the clamp tube 146 distal from the clamp member 140 by a tube flange 150 and bolts 152. The fence support 148 is a rigid, elongate member that is substantially horizontal during normal use. As will be described below, the purpose of the fence support 148 is to provide structural support for the fence tilt assembly 124 and fence lock assembly 126.

Threaded into the front of the fence support 148 is an adjusting bolt 154. An adjusting nut 156 allows the adjusting bolt to be locked into a desired position relative to the fence support 148. The purpose of the adjusting bolt 154 and adjusting nut 156 will be described in further detail below.

Referring again to FIG. 4, it can be seen that the fence tilt assembly 124 comprises first and second extension members 160 and 162, first and second hinge members 164 and 166, and first and second hinge pins 168 and 170. The extension members 160 and 162 are rigidly connected to the fence support 148 by mounting bolts 172. The hinge members 164 and 166 are rigidly connected to the fence member 130 by mounting bolts 172. The hinge pins 168 and 170 extend through holes in the hinge members 164 and 166 and extension members 160 and 162 to pivotally mount the fence member 130 to the fence support 148. Spring clips 176 secure the hinge pins 168 and 170 within the hinge members 164 and 166 and extension members 160 and 162. The fence tilt assembly 124 allows the fence member 130 to rotate about a fence pivot axis B (FIG. 5) as will be described in further detail below.

The fence lock assembly 126 comprises a locking bar 180 that is pivotally connected at one end to the second hinge member 166. The locking bar 180 will thus move with the fence member 130 as the fence member 130 pivots about the fence pivot axis B. The other end of the locking bar 180 extends between a locking plate 182 and one end of the fence support 148. The locking plate 182 is attached to the fence support 148 by a locking plate dowel 184 and locking plate handle 186. The locking plate handle 186 is threaded into the fence support 148 such that rotating the handle 186 moves the locking plate 182 towards and away from the fence support 148.

Rotating the handle 186 in a first direction places the fence lock assembly 126 in a locked configuration in which the locking plate 182 frictionally engages the locking bar 180 to prevent relative movement between the locking bar 180 and fence support 148. Rotating the handle 186 in a second direction places the fence lock assembly 126 in an unlocked configuration in which the locking bar 180 may move relative to the fence support 148.

The pivotal connection between the locking bar 180 and the second hinge member 166 is formed by first and second locking bar bolts 188 and 190. These bolts 188 and 190 engage a hole in the locking bar 180 from opposite directions along a locking axis C such that the locking bar 180 can rotate about this locking axis C. However, the point at which the locking bar 180 rotates about the locking axis C can be adjusted along the locking axis C by turning these bolts 188 and 190. The locking bar bolts 188 and 190 thus allow adjustment of the fence lock assembly 126 to ensure that the fence surface 28 is planar and at the desired jointer fence angle. Nuts 192 are threaded onto the locking bar bolts 188 and 190 to ensure that these bolts 188 and 190 do not move once properly adjusted.

First and second eccentric stops 194 and 196 are secured to the locking bar 180 by stop bolts 198. The eccentric stops 194 and 196 are placed at locations closely associated with predetermined jointer fence angles as will be described below. The eccentric stops 194 and 196 may be rotated and secured by the bolts 198 at angular locations that are precisely associated with predetermined jointer fence angles.

The fence guard assembly 128 comprises a fence guard member 200, fence guard bolts 202, and fence guard spacers 204. As perhaps best shown in FIG. 5, the fence guard member 200 is adapted to be mounted to the underside of the fence support 148 such that, as the fence member 130 moves across the cutter gap 38, the guard member inhibits access to the cutter assembly 34 behind the fence member 130.

Figure 6:
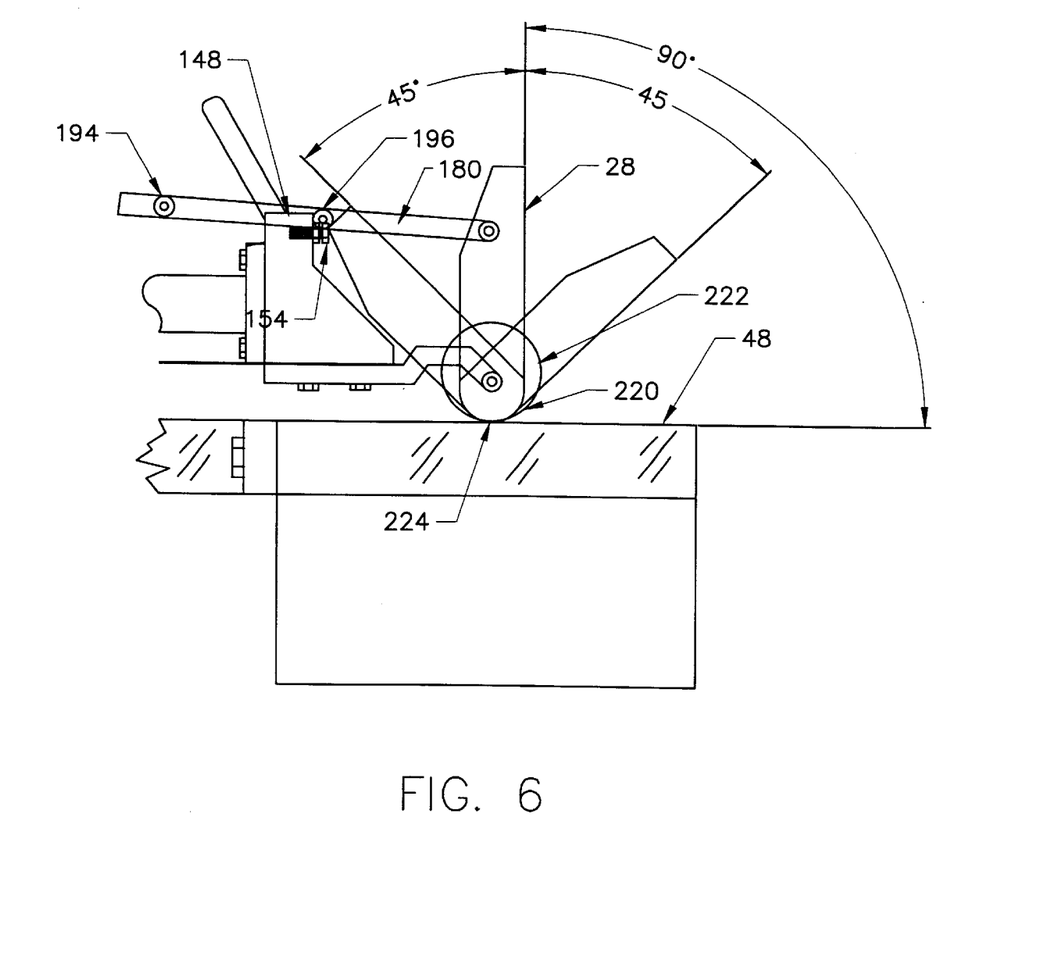
FIG. 6 is a somewhat schematic side elevation view depicting the range of movement of the jointer fence assembly of the jointer system of FIG. 1.

Referring now to FIG. 6, it can be seen that the fence tilt assembly 124 allows the fence member 130 to rotate about the fence pivot axis B. The fence lock assembly 126 limits the range of rotation of the fence member 130 to a 90° arc within the range of 45° and 135° relative to the table surfaces 46 and 48.

A notable characteristic of the fence tilt assembly 124 is that, as the fence member 130 rotates, the fence protectors 132 are suspended above, but held closely adjacent to, the table surfaces 46 and 48 during rotation of the fence member 130. The fence member assembly 120, and the fence extension assembly 122, are thus held above, and do not interfere with the operation of, the infeed and outfeed tables 30 and 32 and cutter assembly 34.

In addition, the fence pivot axis B is spaced above the table surfaces 46 and 48 by a predetermined distance; this predetermined distance ensures that the fence protectors 132 do not lift off of the table surfaces 46 and 48 during rotation of the fence member 130. The fence protectors 132 preferably just touch the outfeed table surface 48. The distance between the protectors 132 and table surface 48 is preferably within a first preferred range of 0 to 1.0 millimeters and in any event should be with within a second preferred range of 0to 3.0 millimeters.

In the preferred embodiment, the fence protectors 132 have a curved lower surface 220. At least a portion of the radius of curvature of this surface 220 generally corresponds the radius of a circle 222 centered at the fence pivot axis B and extending through a portion 224 of the surface 220. Stated alternatively, the radius of curvature of the surface 220 is preferably approximately the same as the predetermined distance between the fence axis B and the outfeed table surface 48. The radius of curvature of the fence protectors 132 is approximately 15 millimeters in the preferred embodiment; this radius is preferably within a first preferred range of 15±5% millimeters and in any event should be with within a second preferred range of 15±10% millimeters.

Figure 8:
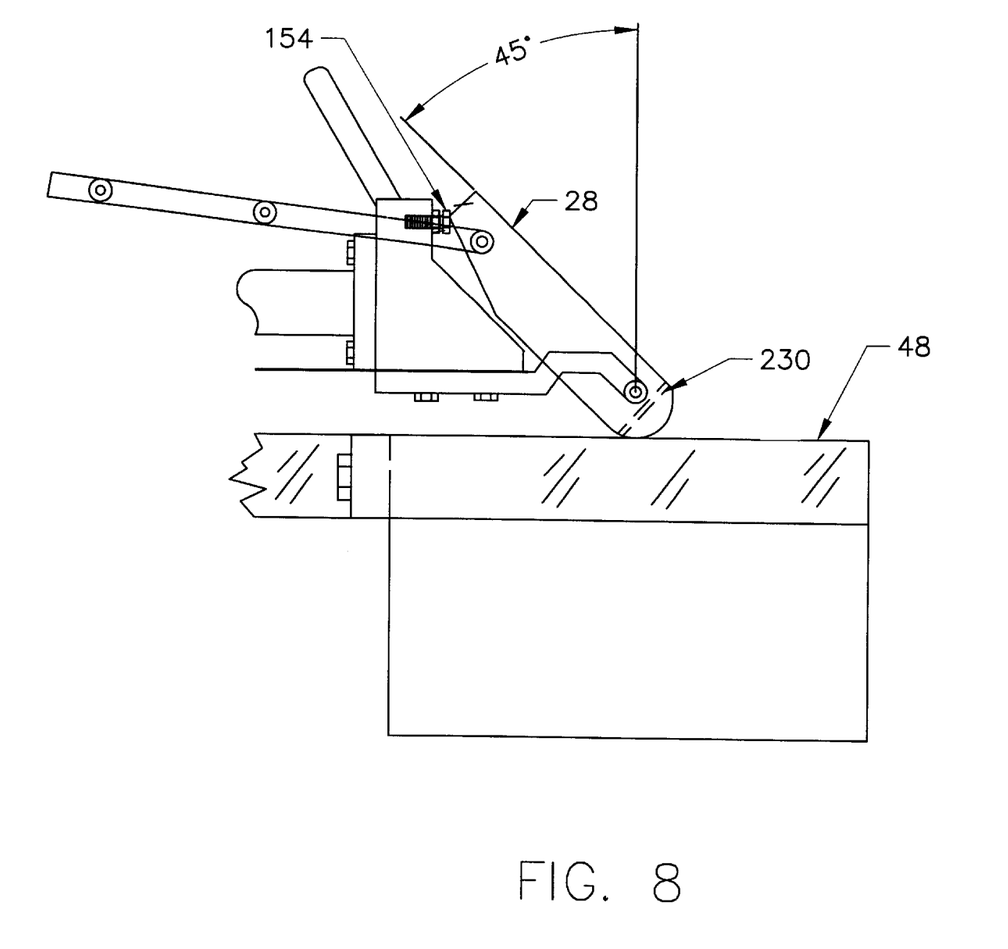
FIG. 8 is a somewhat schematic side elevation view depicting the jointer fence assembly of the jointer system of FIG. 1 in a reverse 45° configuration.
Figure 9:
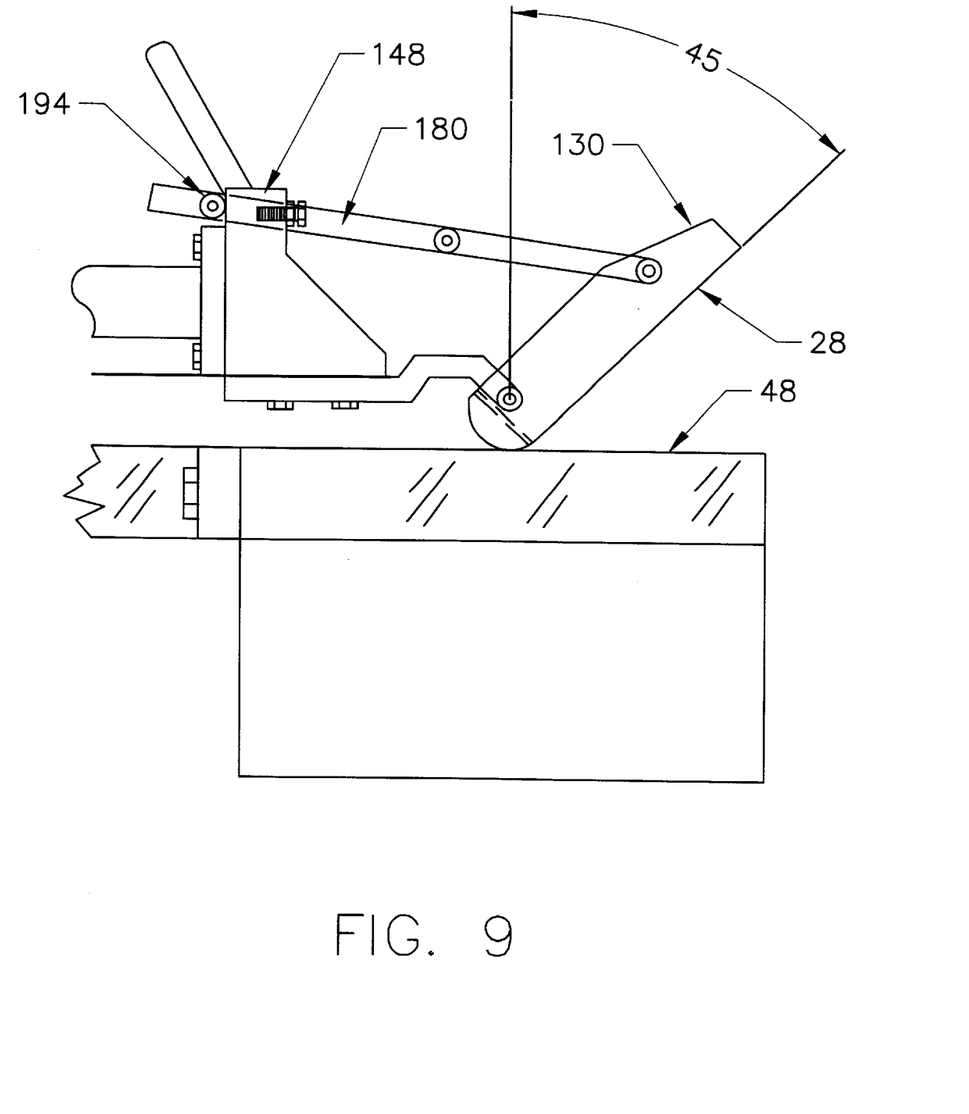
FIG. 9 is a somewhat schematic side elevation view depicting the jointer fence assembly of the jointer system of FIG. 1 in a forward 45° configuration.

Accordingly, as shown in FIGS. 8–10, the fence protectors 132 preferably touch, or at least are held as close as possible to, the table surfaces 46 and 48 as the fence member 130 rotates through its 90° arc. In addition, the distance of the fence protectors 132, and thus the fence member 130, above the table surfaces 46 and 48 is kept substantially constant as the fence member 130 rotates about the fence pivot axis B.

Referring for a moment back to FIG. 5, it can be seen that the fence member 130 comprises a lower wall 230. This lower wall 230 must extend along the entire length of the fence member 130 to obtain a fence member 130 that can be manufactured at low cost yet still be sufficiently rigid to support the workpiece during normal operation. The extension members 160 and 162 define notch portions 240 and 242 that allow the fence member 130 rotate through its 90° arc without interference between the lower wall 230 and the extension members 160 and 162.

Another notable aspect of the fence tilt assembly 124 is the arrangement of the fence pivot axis B relative to a fence plane P (FIG. 5) defined by the fence member assembly 120. The fence plane P is a plane parallel to the fence surface 28 that extends through the fence member assembly 120 at location that is approximately equidistant from the front and back of the fence member 130. The fence plane P thus extends approximately through the center of gravity of the fence member assembly 120. The exemplary locking axis C described above is arranged between the fence plane P and a plane including the fence surface 28.

The first and second hinge members 164 and 166 are shaped such that the fence pivot axis B is within the fence member assembly 120 and lies substantially along the fence plane P. Accordingly, the majority of the weight of the fence member 130 is carried straight through a single axis (the fence pivot axis B). The manner in which the weight of the fence member 130 is carried by the fence tilt assembly 124 reduces the likelihood that manufacturing tolerances will interfere with precise and repeatable establishment of the jointer fence angle.

Figure 7:
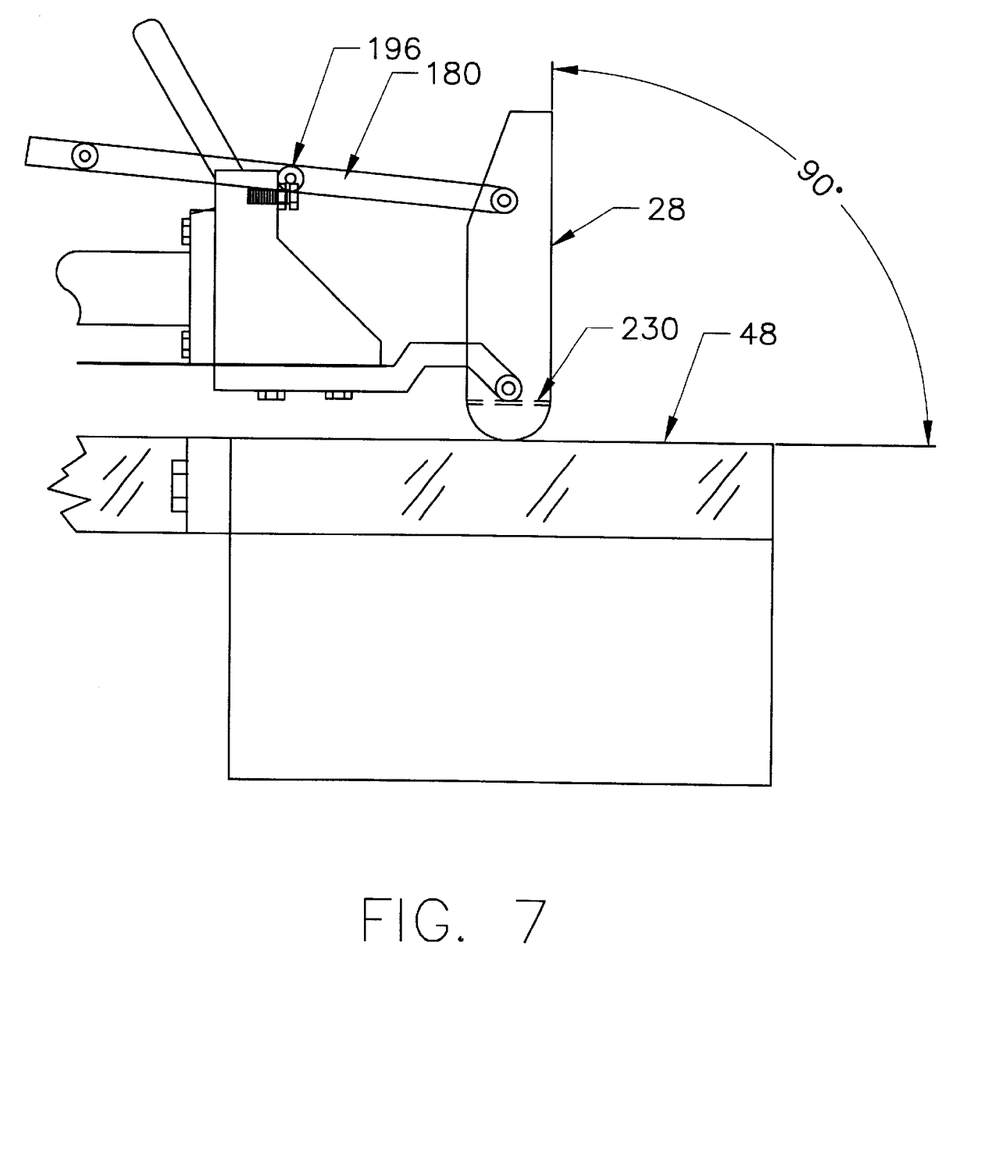
FIG. 7 is a somewhat schematic side elevation view depicting the jointer fence assembly of the jointer system of FIG. 1 in a 90° configuration.

As shown in FIG. 7, the second eccentric stop 196 is adjusted to engage the fence support 148 when the jointer fence angle is exactly 90°. FIG. 8 shows that the adjusting bolt 154 and adjusting nut 156 are set such that the fence member 130 engages the head of the adjusting bolt 154 when the jointer fence angle is exactly 135° (45° rearward from vertical). FIG. 9 shows that the first eccentric stop 194 engages the fence support 148 when the jointer fence angle is exactly 45° (45° forward from vertical). FIG. 9 further shows the relationship between the notch portions 240 and 242 and the lower wall 230 of the fence member 130 when the fence member 30 is in the forward 45° position.

The exact locations of the eccentric stops 194 and 196 may be moved so that they engage the front, back, or other surface of the fence; in any of these arrangements, the locations should yield the desired fence angle.

Referring back to FIG. 2, depicted therein is a longitudinal axis E of the fence tube 146. The exemplary fence tube axis E is parallel to and arranged substantially above the axis A of the cutter assembly 34.

From the foregoing, it should be clear that the invention may be embodied in other specific forms without departing from the spirit or essential characteristics thereof. The present embodiments are therefore to be considered in all respects as illustrative and not restrictive.

I claim:

1. A jointer fence assembly for a jointer system comprising a table assembly defining a table surface and a cutter gap and a cutter assembly arranged within the cutter gap, comprising:
   a fence member assembly defining a fence surface;
   a fence extension assembly comprising a fence support, where the fence extension assembly allows the fence support to move across the cutter gap;

a fence tilt assembly connected between the fence support and the fence member assembly such that the fence member assembly rotates about a fence pivot axis spaced above the table surface;

a fence lock assembly connected between the fence support and the fence member that allows a fence angle between the fence surface and the table surface to be locked into a desired angle; wherein a portion of the fence member assembly extends below the fence pivot axis such that the fence member assembly is closely adjacent to the table surface as the fence member assembly rotates about the fence pivot axis; and the fence member assembly defines a curved lower surface, where, as the fence member assembly rotates about the fence pivot axis, the curved lower surface remains substantially on the table surface.

2. A jointer fence assembly as recited in claim 1, in which the fence member assembly comprises a fence member having a lower edge and at least one fence protector mounted on the lower edge of the fence member, where the fence protector defines the curved lower surface of the fence member.

3. A jointer fence assembly as recited in claim 1, in which the jointer fence assembly defines a fence plane that extends substantially through both a center of gravity of the jointer fence assembly and the fence pivot axis.

4. A jointer fence assembly as recited in claim 3, in which the fence plane is substantially parallel to the fence surface.

5. A jointer fence assembly as recited in claim 1, further comprising a fence guard member rigidly connected to the fence support such that the fence guard member extends over at least a portion of the cutter gap behind the fence member assembly.

6. A jointer fence assembly as recited in claim 1, in which the fence extension assembly further comprises a clamp assembly and a fence tube to which the fence support member is rigidly connected, where the fence tube is slidingly received by the clamp assembly and the clamp assembly may be operated to prevent or allow relative movement between the fence tube and the clamp assembly.

7. A jointer fence assembly as recited in claim 6, in which a longitudinal axis of the fence tube is parallel to, and spaced above, a longitudinal axis of the cutter assembly.

8. A jointer fence assembly as recited in claim 1, in which the fence lock assembly comprises:

a locking bar pivotably connected at one end to the fence member assembly and slidably connected at another end to the fence support; and a lock handle for selectively allowing or preventing relative movement between the locking bar and the fence member assembly.

9. A jointer fence assembly as recited in claim 1, in which the fence tilt assembly further comprises:

first and second extension members rigidly connected to the support member;

first and second hinge members rigidly connected to the fence member assembly; and first and second hinge pins that extend through the first and second extension members and first and second hinge members to allow the fence member assembly to rotate relative to the support member about the fence pivot axis.

10. A jointer fence assembly as recited in claim 9, in which:

the fence member assembly comprises a bottom wall; and the first and second extension members are configured such that the bottom wall of the fence member assembly does not contact the first and second extension members when the fence member assembly rotates away from the support member.

11. A jointer fence assembly as recited in claim 10, in which the first and second extension members define a notch portion that receives the bottom wall of the fence member assembly when the fence member assembly rotates away from the support member.

12. A method of supporting a workpiece on a jointer system defining a table surface and a cutter gap, comprising:

providing a fence member assembly defining a fence surface;

providing a fence extension assembly comprising a fence support, where the fence extension assembly allows the fence support to move across the cutter gap;

connecting the fence member assembly to the fence support such that the fence member assembly rotates about a fence pivot axis spaced above the table surface, and the fence member assembly is closely adjacent to the table surface as the fence member assembly rotates about the fence pivot axis;

locking the fence member relative to the support member to fix a fence angle between the fence surface and the table surface at a desired angle;

arranging the workpiece against the table surface and the fence surface during operation of the jointer system; and forming a bottom surface on the fence member assembly such that a distance between the fence member assembly and the table surface remains substantially constant as the fence member assembly rotates about the fence pivot axis.

13. A method as recited in claim 12, in which the bottom surface of the fence member assembly has a radius of curvature that generally corresponds to a distance between the fence pivot axis and the table surface.

14. A jointer system comprising:

a table assembly defining a table surface and a cutter gap;

a cutter assembly arranged within the cutter gap;

a fence member assembly defining a fence surface;

a fence extension assembly comprising a fence support, where the fence extension assembly allows the fence support to move across the cutter gap;

a fence tilt assembly connected between the fence support and the fence member assembly such that the fence member assembly rotates about a fence pivot axis spaced above the table surface;

a fence lock assembly connected between the fence support and the fence member that allows a fence angle between the fence surface and the table surface to be locked into a desired angle; wherein a portion of the fence member assembly extends below the fence pivot axis such that the fence member assembly is closely adjacent to the table surface as the fence member assembly rotates about the fence pivot axis; and the fence member assembly defines a curved lower surface, where, as the fence member assembly rotates about the fence pivot axis, the curved lower surface remains a predetermined distance above the table surface.

15. A jointer fence assembly as recited in claim 14, in which the fence member assembly comprises a fence member having a lower wall and at least one fence protector mounted on the lower wall of the fence member, where the fence protector defines the lower surface of the fence member.

16. A jointer fence assembly as recited in claim 14, in which the jointer fence assembly defines a fence plane that extends substantially through both a center of gravity of the jointer fence assembly and the fence pivot axis.

17. A jointer fence assembly as recited in claim 14, in which the fence tilt assembly further comprises:
   first and second extension members rigidly connected to the support member;
   first and second hinge members rigidly connected to the fence member assembly; and
   first and second hinge pins that extend through the first and second extension members and first and second hinge members to allow the fence member assembly to rotate relative to the support member about the fence pivot axis.

18. A jointer fence assembly as recited in claim 17, in which:
   the fence member assembly comprises a bottom wall; and
   the first and second extension members are configured such that the bottom wall of the fence member assembly does not contact the first and second extension members when the fence member assembly rotates away from the support member.

19. A jointer fence assembly as recited in claim 18, in which the first and second extension members define a notch portion that receives the bottom wall of the fence member assembly when the fence member assembly rotates away from the support member.

20. A jointer fence assembly for a jointer system comprising a table assembly defining a table surface and a cutter gap and a cutter assembly arranged within the cutter gap, comprising:
   a fence member assembly defining a fence surface;
   a fence extension assembly comprising a fence support, where the fence extension assembly allows the fence support to move across the cutter gap;
   a fence tilt assembly connected between the fence support and the fence member assembly such that the fence member assembly rotates about a fence pivot axis spaced above the table surface;
   a fence lock assembly connected between the fence support and the fence member that allows a fence angle between the fence surface and the table surface to be locked into a desired angle; wherein
   a portion of the fence member assembly extends below the fence pivot axis such that the fence member assembly is closely adjacent to the table surface as the fence member assembly rotates about the fence pivot axis; and
   the jointer fence assembly defines a fence plane that extends substantially through both a center of gravity of the jointer fence assembly and the fence pivot axis.

21. A jointer fence assembly as recited in claim 3, in which the fence plane is substantially parallel to the fence surface.

22. A jointer fence assembly for a jointer system comprising a table assembly defining a table surface and a cutter gap and a cutter assembly arranged within the cutter gap, comprising:
   a fence member assembly defining a fence surface;
   a fence extension assembly comprising a fence support, where the fence extension assembly allows the fence support to move across the cutter gap;
   a fence tilt assembly connected between the fence support and the fence member assembly such that the fence member assembly rotates about a fence pivot axis spaced above the table surface;
   a fence lock assembly connected between the fence support and the fence member that allows a fence angle between the fence surface and the table surface to be locked into a desired angle; wherein
   a portion of the fence member assembly extends below the fence pivot axis such that the fence member assembly is closely adjacent to the table surface as the fence member assembly rotates about the fence pivot axis;
   the jointer fence assembly defines a fence plane that extends substantially through both a center of gravity of the jointer fence assembly and the fence pivot axis; and
   the fence pivot assembly further comprises:
      first and second extension members rigidly connected to the support member;
      first and second hinge members rigidly connected to the fence member assembly; and
      first and second hinge pins that extend through the first and second extension members and first and second hinge members to allow the fence member assembly to rotate relative to the support member about the fence pivot axis.

23. A jointer fence assembly as recited in claim 22, in which:
   the fence member assembly comprises a bottom wall; and
   the first and second extension members are configured such that the bottom wall of the fence member assembly does not contact the first and second extension members when the fence member assembly rotates away from the support member.

24. A jointer fence assembly as recited in claim 23, in which the first and second extension members define a notch portion that receives the bottom wall of the fence member assembly when the fence member assembly rotates away from the support member.

* * * * *